June 10, 1924. 1,497,325
P. J. CHARBONNIER
EXTRACTION DEVICE FOR ARTILLERY
Filed July 27, 1922  10 Sheets-Sheet 3

Inventor:
P.J.Charbonnier
By Marks Clerk
Att'ys

Patented June 10, 1924.

1,497,325

UNITED STATES PATENT OFFICE.

PROSPER JULES CHARBONNIER, OF PARIS, FRANCE.

EXTRACTION DEVICE FOR ARTILLERY.

Application filed July 27, 1922. Serial No. 578,002.

*To all whom it may concern:*

Be it known that I, PROSPER JULES CHARBONNIER, a citizen of the Republic of France, and residing at Paris, Seine Department, in the Republic of France, have invented certain new and useful Extraction Devices for Artillery, of which the following is a specification.

This invention relates to a device which is applied to cannon for the purpose of extracting the cartridge cases, and it is applicable to all types and calibres, comprising elements of a simple character and reliable operation.

The said device makes use of the power stored up by the recoil of the spring recuperators in order to effect the extraction proper, the first starting of the cartridge case being obtained by the opening of the breech block.

The form of construction described hereunder by way of example is applicable to all types of cannon, and more particularly to cannon provided with the breech block according to the patent application No. 579,240, filed July 27, 1922, for counterbalanced breech block. In said form of construction, a hook submitted to the action of a spring which is cocked by the recoil and engages when the breech is first opened with a nib which is adapted to fit under the rim of the cartridge case; said spring is disengaged at the end of the opening movement, and the extraction takes place; a second spring which is also cocked by the recoil is used to return the elements to the initial position.

The accompanying drawing shows by way of example the said form of construction according to the invention, as well as various modified forms.

The starting device shewn in Figs. 1 to 5 comprises at either side of the bore of the gun a frame 18 adapted to swing upon an axle 19 secured to the breech. The said frame ends in a nib 20 fitting under the rim of the cartridge case, the two nibs 20 being disposed at the ends of a diameter of said cartridge case. To the axle 19 is pivoted a rocker 21 having pivoting thereto the two arms 22, 23 mounted respectively upon the axles 24, 25 secured to the frame 18. To the rocker 21 is pivoted a link 26 which is connected with the lever 27 by the axle 28; the said lever which is wedge-shaped is adapted to move along a shoulder 29 on the swinging frame 18 and a shoulder 70 on the breech. On the other hand, the breech block 3 is provided with a projection or cam 30.

Figure 1:
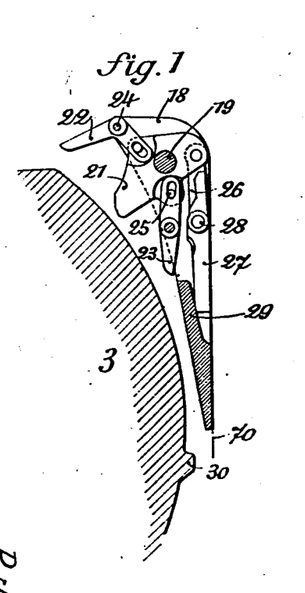
Fig. 1 is a sectional view of the starting device.
Figures 2, 3, 4, 5:
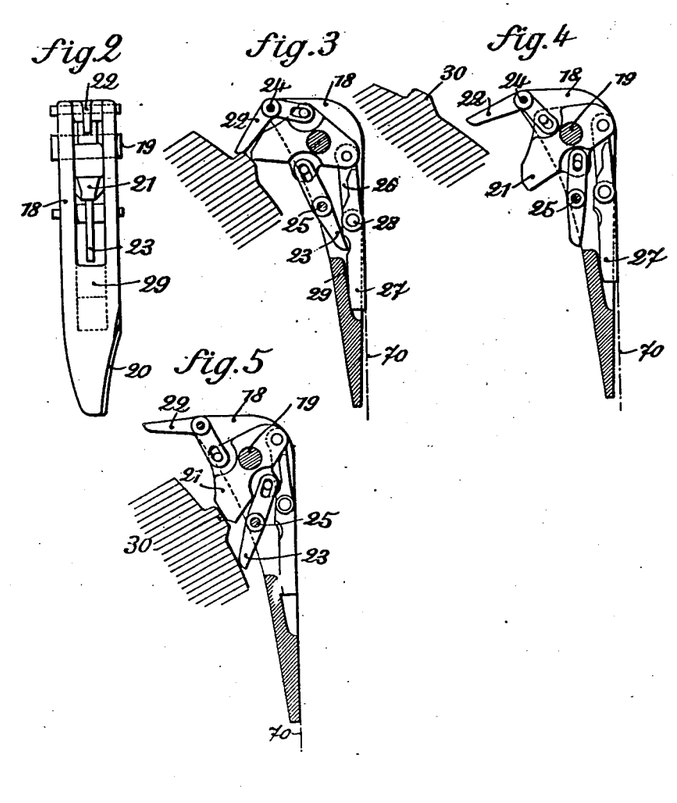
Fig. 2 is a side elevation of the same.
Figs. 3, 4 and 5 shew the same device in section in various positions.

The said device is operated as follows:

When the breech is closed, the nibs 20 will fit under the rim of the cartridge case, Fig. 1. In the movement of opening the breech, Fig. 3, the cam 30 will raise the rocker 21 which pivots on its axles 19 and pushes the lever 27 through the medium of the link 26. It will follow that the said lever when driven between the shoulders 29 and 70, will drive back the frame 18 and start the cartridge case. As the breech continues to open. Fig. 4, the cam 30 after disengagement from the rocker 21 will strike the arm 22 and cause it to pivot on the axle 24, whence it will result that the rocker 21 will pivot on the axle 19 and the lever 27 will be raised, permitting the nib 20 to return to the initial position due to the insertion of a fresh cartridge.

In the closing movement of the breech, Fig. 5, the cam 30 again strikes the rocker 21 and causes it to swing, and the arm 23 will pivot on the axle 25 in such manner as to assume a position in the path of the cam.

The said arm will therefore return in the contrary sense to its preceding movement and will bring back the rocker 21 into the position Fig. 1. At the same time, the arm 22 will also resume its first position.

Figure 6:
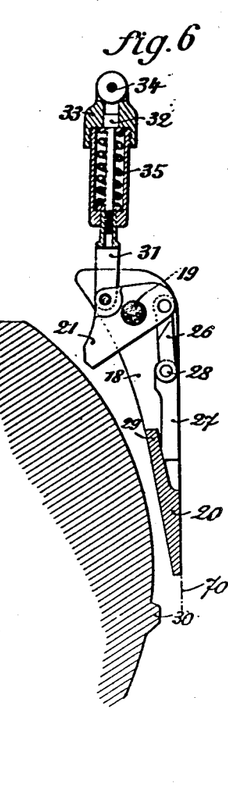
Fig. 6 is a sectional view of a modified form of said device.
Figure 7:
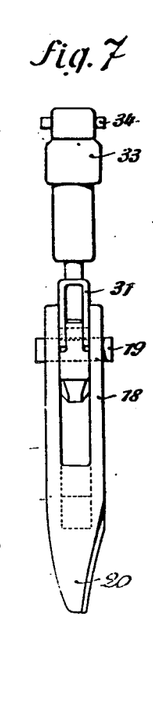
Fig. 7 is a side elevation of the same.
Figure 8:
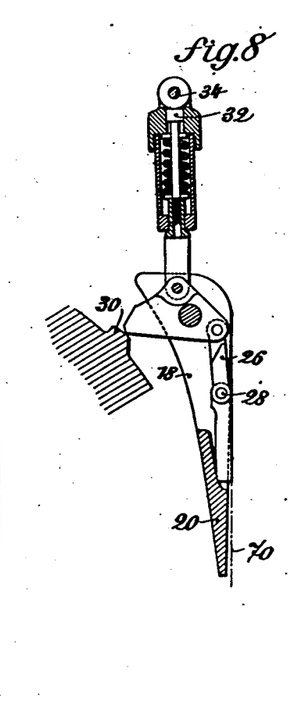
Figs. 8, 9 and 10 are sectional views representing various positions of said modified form.
Figure 9:
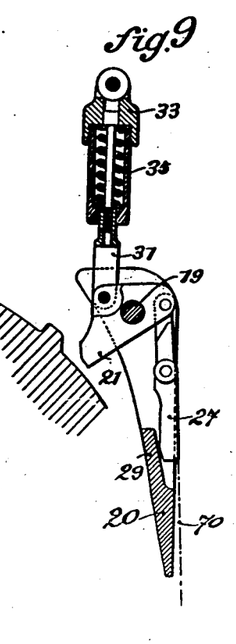
Figure 10:
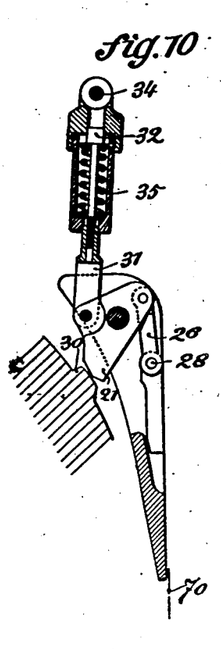

Figs. 6 to 10 shew the various positions of a starting device of a somewhat different character. The above-mentioned arms 22 and 23 are eliminated and are replaced by a spring device comprising a piston rod 31 pivoted to the rocker 21 and attached to a piston 32 movable against the spring 35 in the cylinder 33 which is mounted on an axle 34 secured to the breech. In Fig. 6, the breech block is in the closed position and the nib 20 is engaged under the rim of the cartridge case. In the movement of opening the breech, the cam 30 raises the rocker 21; the spring 35 is compressed and the lever 27 descends thereby effecting the starting operation, Fig. 8. When the cam ceases to act upon the rocker 21, Fig. 9, the spring 35 drives back the rod 31 and returns the rocker 21 to the initial position. During the closing movement, Fig. 10, the rocker 21 is moved by the cam 30; the spring 35 is downwardly compressed by the piston 32, and the lever 27 is raised. As the movement of the breech block continues, the cam 30 will leave the rocker 21, the spring 35 will expand, and the elements will take the initial position.

After the operation of the starting device, the cartridge case is automatically extracted, for example by the device which is shewn in its various positions in Figs. 11 to 14. The said device comprises a claw 36 slidable in a slot in the breech block 3: said claw is drawn back, when the breech block attains a given position, by a plate 37 actuated by a spring 38 which is previously compressed. A second spring 39 serves to bring the device to the initial position after the extraction. The spring 38 is disposed within the cylinder 40 which is secured to the plate 37, and it is maintained between the end of a second cylinder 41 which is slidable in the first. A central rod 42 having a head at each end serves to limit the spacing between the two ends of the cylinders. The spring 39 is disposed within a cylinder 43 secured to the plate 37; it is maintained between the end of said cylinder and a piston 45 whereof the rod 44 is secured to the gun. A spring-pressed latch 46 serves to attach the plate 37 to the gun, and a guide piece 47 secured to the cannon provides for the sliding of the cylinders 40 and 43. An arm secured to the gun carriage is provided with a spring bolt 49 disposed opposite an aperture 71 in the cylinder 40.

The operation of said device is as follows:
When the discharge takes place, the recoil forces back the entire device with the exception of the arms 48. When no longer held by the cylinder 41, the spring bolt 49 will be driven into the cylinder 40. After the recoil and the return to battery, the elements will be in the position Fig. 12, which presents no difference from Fig. 11 save that the spring 38 is now compressed between the ends of the cylinders 40 and 41. This compression tends to move the whole combination of plate and cylinders to the rear, but the latch 46 prevents this movement.

The power stored up by the compression of the spring 38 is intended to serve for the extraction of the cartridge case as well as to compress the spring 39; after the extraction, said spring will effect the return of the device to the initial position.

Figure 13:
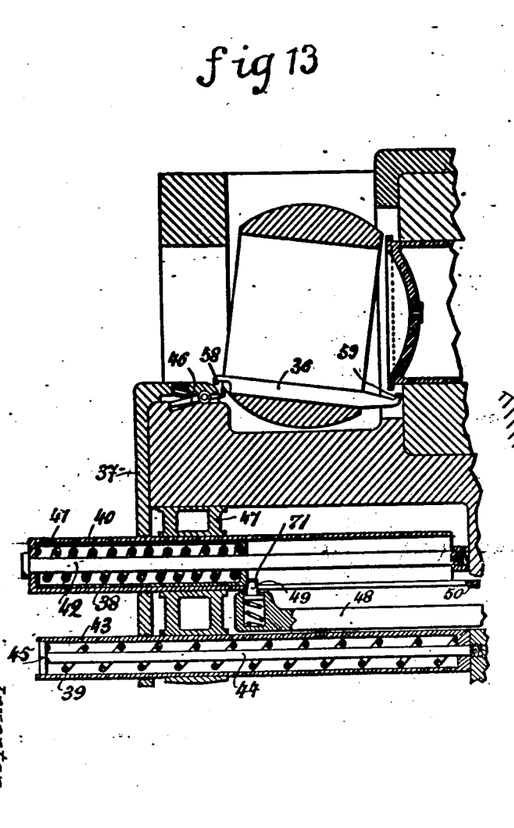
Figure 14:
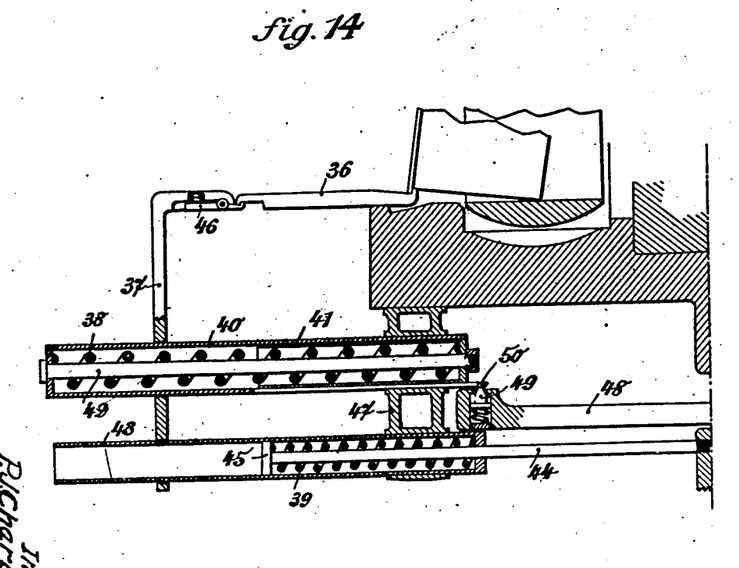

Referring to Fig. 13, it will be observed that the starting device has now acted. At the end of the opening movement of the breech block, the claw 36 engages the rim of the cartridge case whilst its opposite end acts upon the latch 46, causing it to swing; this permits the spring 38 to expand, Fig. 14, thereby actuating the plate 37, claw 36, cylinder 40 and rod 42, as well as the cylinder 43, and the cartridge case is thus extracted. Inasmuch as the rod 44 is secured to the gun, the end of the cylinder 43 compresses the spring 39 against the piston 45, as shewn in Fig. 14.

Figure 11:
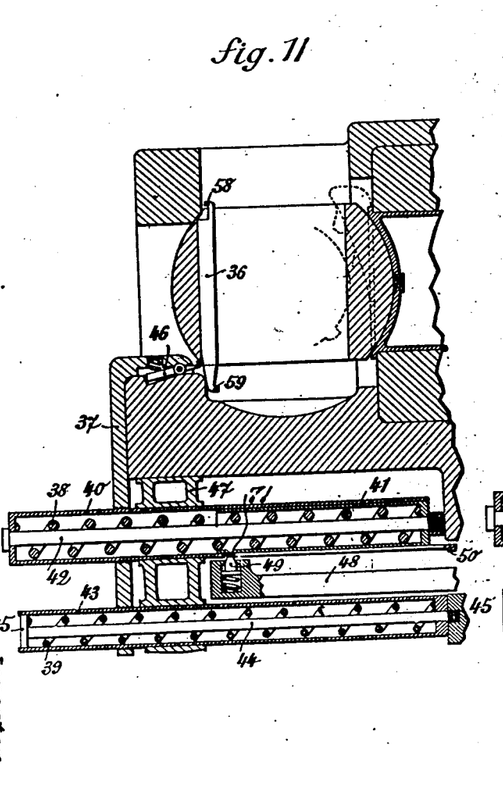
Fig. 11 is an axial section of the gun shewing an extraction device in diagrammatic view.
Figure 12:
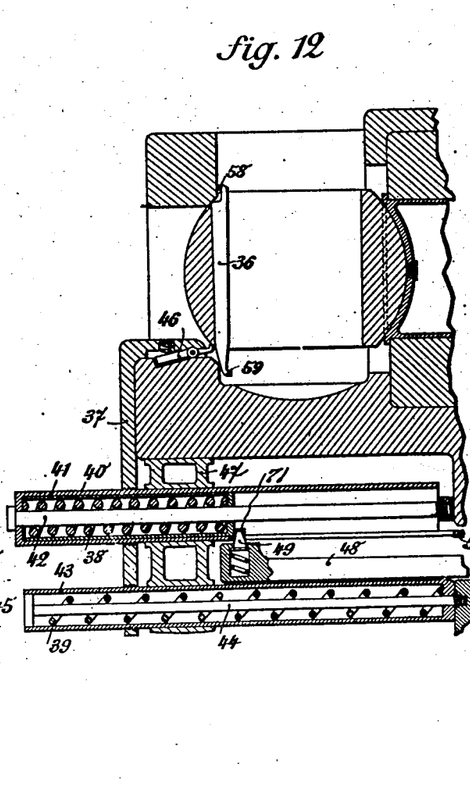
Figs. 12, 13 and 14 shew various other positions of said device.

At the end of the movement of the cylinder 40, the spring-bolt 49 is pressed down by a stud disposed on the cylinder 40; the cylinder 41 is no longer retained, and the whole device will now return to the initial position by the action of the spring 39, Fig. 11, except that the breech block remains open. The said device might be used for small calibres should it be necessary, but by reason of the relative extent of the recoil and the stroke required for the extraction, it is preferable in order to afford a general device, to adopt the arrangement shewn in Figs. 15 to 21.

Figure 15:
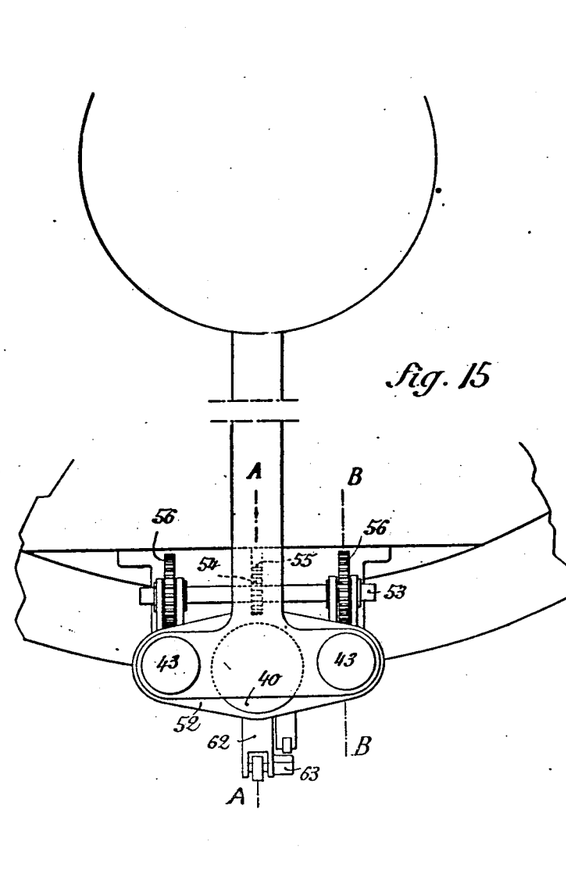
Fig. 15 is an end elevation of a modified form of construction of the extraction device.
Figure 16:
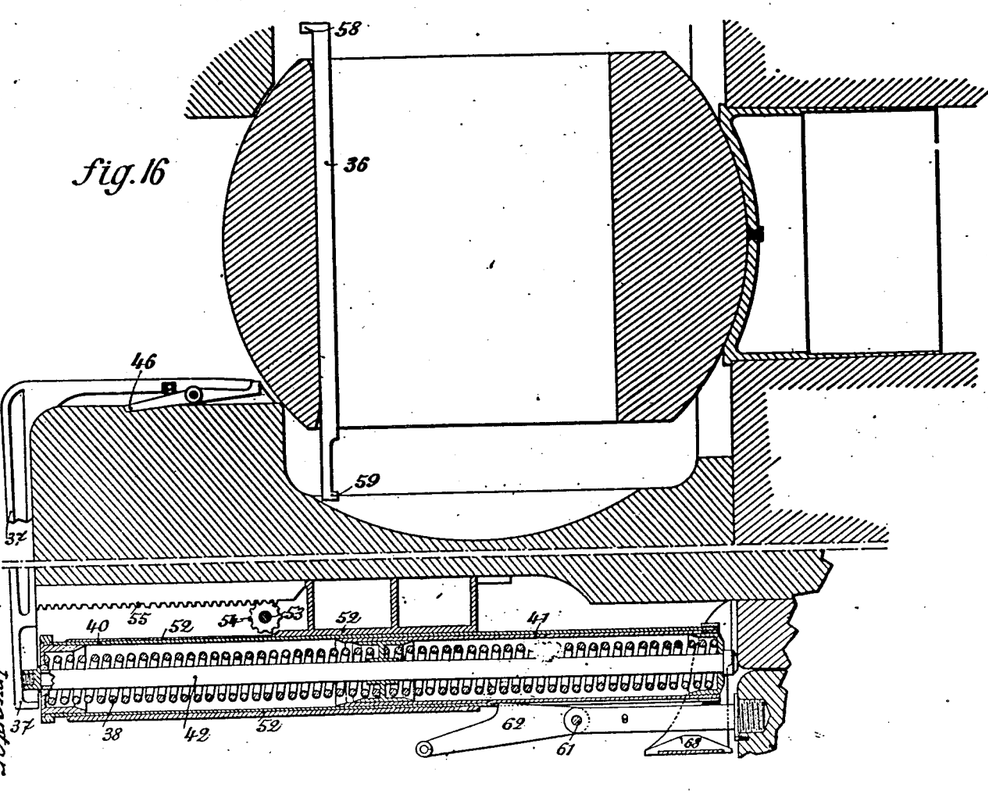
Fig. 16 is a section on the line A—A Fig. 15.
Figure 17:
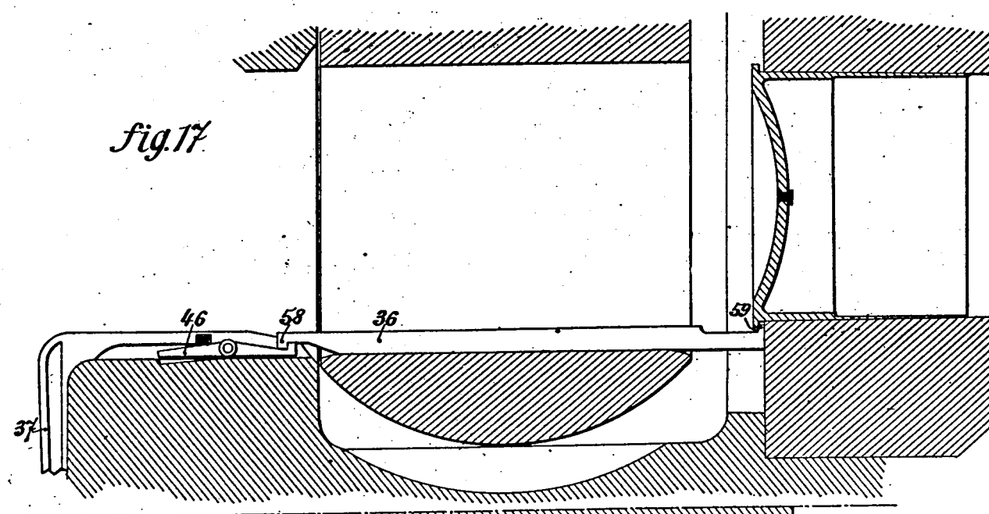
Fig. 17 is a section on the line B—B of the same figure.
Figure 18:
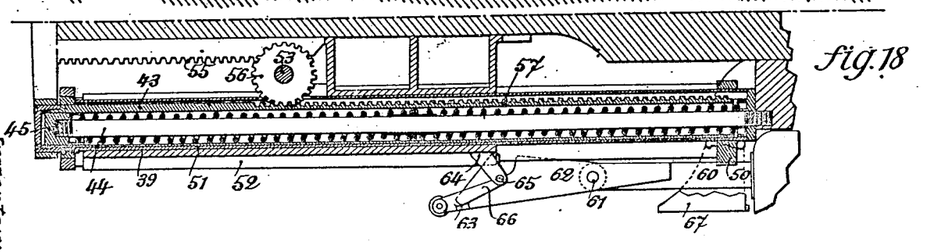
Figs. 18, 19, 20 and 21 are sectional views analogous to Fig. 16 shewing various portions of the apparatus.
Figure 19:
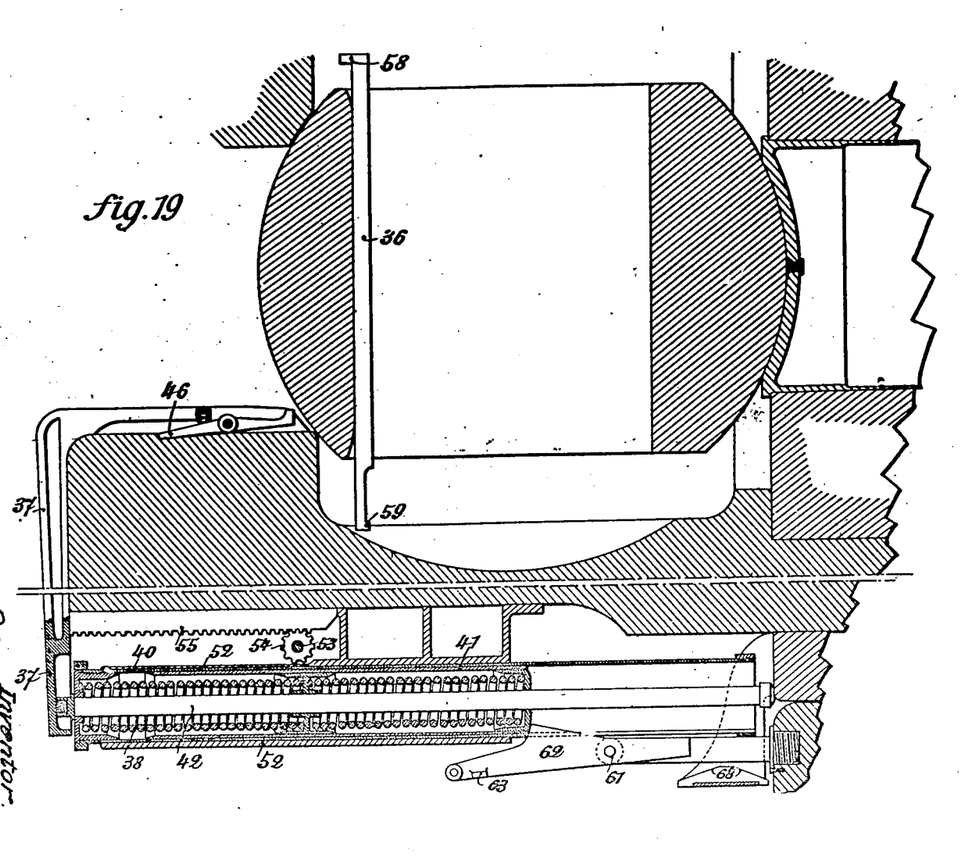
Figure 20:
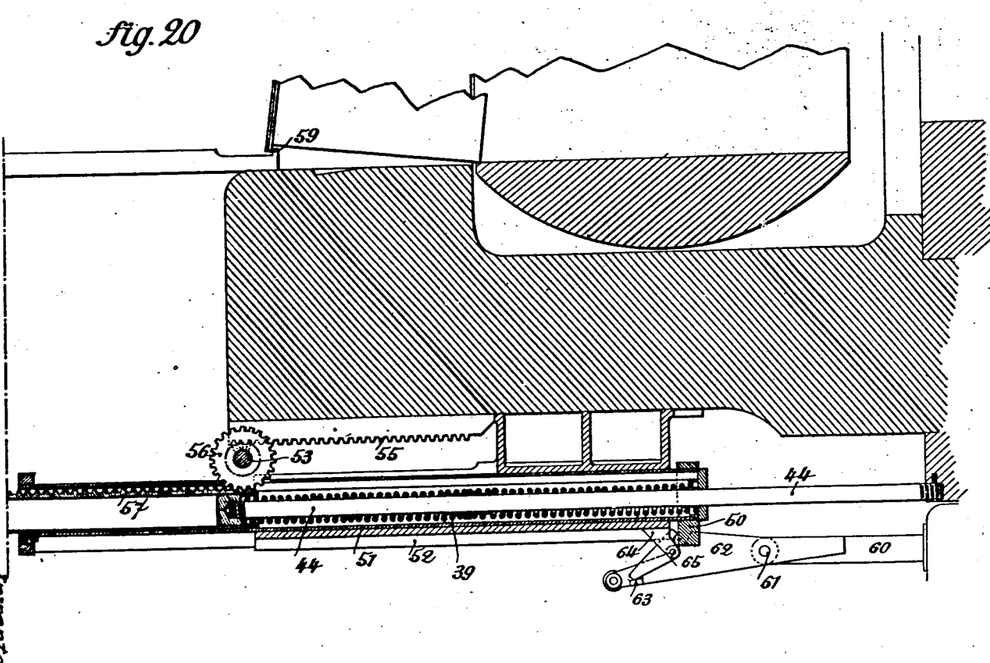
Figure 21:
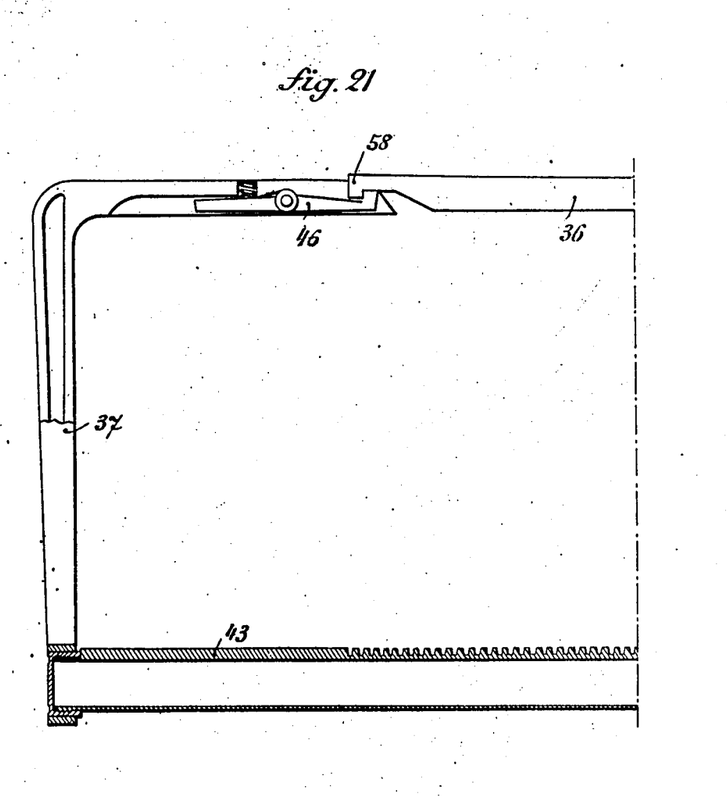

The said device comprises two return cylinders 43 disposed on either side of the extraction cylinder 40. In each cylinder 43 is disposed a spring 39 and a central rod 44. The rods 44 are secured to the gun and are provided at the outer end with the heads 45. The cylinders 43 are disposed within the cylinders 51 which are secured to the cylinder 40; the latter contains a spring 38 and a central rod 42 having a head at each end; the cylinders 51 and 40 are slidable in a support 52 secured to the gun.

A horizontal shaft 53 is mounted on the two cylinders 51; three pinions are keyed to said shaft; at the middle part is disposed a pinion 54 engaging a rack 55 mounted upon the gun, and at the sides are disposed two pinions 56 respectively engaging the racks 57 mounted on the top of the cylinders 43. The said device comprising racks and pinions is employed to increase the amount of rearward movement; to this effect, the diameter of the wheels 56 is greater than that of the wheel 53. When the cylinders 51 together with shaft 53, and the three pinions are moved to the rear, the cylinders 43 will be moved in the same direction but to a greater extent, depending upon the ratio of the wheel diameters. As before, a bar 36 disposed upon the breech block is provided with two hooks 58, 59. An arm 60 secured to the carriage has mounted thereon an axle 61 whereupon is pivoted a latch 62 having the nib 63; the support 52 is provided with a lug 64 carrying an axle 65 whereupon is pivoted a rocker 66. The gun is provided with an arm 67 having at the lower part two ramps 68 which act upon the latch 62 upon the recoil and the return to battery.

The said device is operated as follows:

In Fig. 16 the breech block is shewn in the closed position and the gun is loaded. Upon the discharge, the recoil drives back the whole device, with the exception of the elements secured to the carriage, or 60 and 62; in this rearward movement, the ramps 68 will raise the latch 62, and upon returning to battery the end of cylinder 41 is arrested by said latch. The elements will now assume the positions Fig. 18; no change is made in the position shewn in Fig. 16, except that the spring 38 is compressed; this compression will tend to drive back the whole sliding device, but the latch 46 prevents this movement.

The power stored up in spring 38 serves to extract the cartridge case as well as to compress the springs 39 which effect the return of the device to the initial position after the extraction has taken place. The rotation of the breech block when opened will first cause the starting device to operate, and then the hook 59, Fig. 19, engages the rim of the cartridge case at the same time that the hook 58 engages the upper part of the plate 37 and causes the latch 46 to swing so that the rear end thereof is disengaged from the breech. The spring 38 will now expand, Fig. 20, actuating the plate 37, claw 36, cylinders 43, with springs 39, and cylinders 51 and 40. The cartridge case is thus extracted, and then removed or ejected.

The rods 44 being secured to the gun, the springs 39 will be compressed between the heads 45 and the ends of the cylinders 51 at the end of the recoil movement. The stud 50 of the cylinder 40 will pivot the rocker 66 on its axle 65 and said rocker will bear upon the nib 63 and thus drives down the latch 62. The cylinder 41 is no longer retained, and the whole device under the action of the springs 39 will now return to the initial position, Fig. 16, except that the breech is now open.

Claims:

1. In a cannon provided with a counterbalanced rotating breech block, a device for cartridge case extraction comprising a frame disposed upon both sides of the cannon and pivoting in a plane parallel to the axis of the cannon, a nib provided at one end of said frame and fitting under the rim of the cartridge case for the purpose of starting the same, a double-armed lever pivoting upon said frame, a cam disposed upon the breech block and coöperating with said lever upon the rotation of the breech block, a wedge-shaped arm pivoting upon said lever and engaging between said pivoting frame and the cannon for the separation of these two elements, and means for returning said double-armed lever to the inoperative position after each passage of the said cam.

2. In a cannon provided with a counterbalanced rotating breech block, a device for cartridge case extraction comprising a frame disposed upon both sides of the cannon and pivoting in a plane parallel to the axis of the cannon, a nib provided at one end of said frame and fitting under the rim of the cartridge case for the purpose of starting the same, a double-armed lever pivoting upon said frame, a cam disposed upon the breech block and coöperating with said lever upon the rotation of the breech block, a wedge-shaped arm pivoting upon said lever and engaging between said pivoting frame and the cannon for the separation of these two elements, two arms swinging upon said frame and disposed on either side of said double-armed lever, said arms being adapted to be actuated by said cam and to actuate said lever in such manner as to return the same to the inoperative position after each passage of the said cam.

3. In a cannon provided with a counterbalanced rotating breech block, a device for cartridge case extraction comprising a frame disposed upon both sides of the cannon and pivoting in a plane parallel to the axis of the cannon, a nib provided at one end of said frame and fitting under the rim of the cartridge case for the purpose of starting the same, a double-armed lever pivoting upon said frame, a cam disposed upon the breech block and coöperating with said lever upon the rotation of the breech block, a wedge-shaped arm pivoting upon said lever and engaging between said pivoting frame and the cannon for the separation of these two elements, springs acting upon said lever after the passage of the said cam whereby the lever is returned to the inoperative position, and stop-pieces fixing the inoperative position of said lever.

4. In a cannon provided with a counterbalanced rotating breech block, a device for cartridge case extraction comprising a frame disposed upon both sides of the cannon and pivoting in a plane parallel to the axis of the cannon, a nib provided at one end of said frame and fitting under the rim of the cartridge case for the purpose of starting the same, a double armed lever pivoting upon said frame, a cam disposed upon the breech block and cooperating with said lever upon the rotation of the breech block, a wedge-shaped arm pivoting upon said lever and engaging between said pivoting frame and the cannon for the separation of these two elements, a rod pivoted to said lever, two pistons mounted on said rod, a guide for said pistons which is pivoted to the cannon, a spring disposed between said pistons, a washer movable upon each piston and adapted to receive the thrust of said spring, stop-pieces disposed upon said guide and adapted to arrest the said washers and to permit the compression of the spring during the passage of the said cam.

5. In a cannon provided with a counter-balanced rotating breech block and having therein an aperture for the passage of projectiles, a device for cartridge case extraction comprising a claw which is slidable upon said breech block parallel to the axis of said aperture, a hook provided at the forward end of said claw and engaging under the rim of the cartridge case when the breech is opened, and means for effecting the rearward motion of the said claw.

6. In a cannon provided with a counter-balanced rotating breech block and having therein an aperture for the passage of projectiles, a device for cartridge case extraction comprising a claw which is slidable upon said breech block parallel to the axis of said aperture, a hook provided at the forward end of said claw and engaging under the rim of the cartridge case when the breech is opened, a hook provided at the rear end of said claw, a plate which is slidable upon the cannon parallel to the axis thereof, means for engaging said claw with said plate when the breech block is opened, actuating means adapted to exert a pressure upon said plate when the cannon returns to battery and to effect the recoil of the plate and the extraction of the cartridge case when said breech block is opened.

7. In a cannon provided with a counter-balanced rotating breech block and having therein an aperture for the passage of projectiles, a device for cartridge case extraction comprising a claw which is slidable upon said breech block parallel to the axis of said aperture, a hook provided at the forward end of said claw and engaging under the rim of the cartridge case when the breech is opened, a hook provided at the rear end of said claw, a plate which is slidable upon the cannon parallel to the axis thereof, a spring latch pivoting upon said plate, a stop-piece disposed upon the cannon and having the said latch engaging in the rear of the same in order to counteract the recoil of the said plate, a hook provided upon said latch and adapted to engage the rear hook of said claw and to be disengaged from the said stop-piece by said rear hook when the breech block is opened, and means for effecting the recoil of said plate.

8. In a cannon provided with a counter-balanced rotating breech block, and having therein an aperture for the passage of projectiles, a device for cartridge case extraction comprising a claw which is slidable upon said breech block parallel to the axis of said aperture, a hook provided at the forward end of said claw and engaging under the rim of the cartridge case when the breech is opened, a hook provided at the rear end of said claw, a plate which is slidable upon the cannon parallel to the axis thereof, means for engaging said plate with the said claw when the breech is opened, means for engaging said plate with the cannon and for releasing it therefrom, a spring adapted to press at one end upon said plate and at the other end upon the rear of the cannon and to be compressed by the return of the cannon to battery.

9. In a cannon provided with a counter-balanced rotating breech block and having therein an aperture for the passage of projectiles, a device for cartridge case extraction comprising a claw which is slidable upon said breech block parallel to the axis of said aperture, a hook provided at the forward end of said claw and engaging under the rim of the cartridge case when the breech is opened, a plate which is slidable upon the cannon parallel to the axis thereof, means for engaging said plate with the said claw when the breech is opened, means for engaging said plate with the cannon and for releasing it therefrom, an outer cylinder provided with a bottom and disposed upon said plate parallel to the axis of the cannon, an inner cylinder provided with a bottom and adapted to slide within the said outer cylinder and to bear loosely against the cannon, a spring disposed within the two cylinders and adapted to bear upon the two cylinder bottoms and to separate the same, and means for retaining said inner cylinder after the recoil and during the return of the cannon to battery, the said spring being then compressed.

10. In a cannon provided with a counter-balanced rotating breech block and having therein an aperture for the passage of projectiles, a device for cartridge case extraction comprising a claw which is slidable upon said breech block parallel to the axis of said aperture, a hook provided at the forward end of said claw and engaging under the rim of the cartridge case when the breech is opened, a plate which is slidable upon the cannon parallel to the axis thereof, means for engaging said plate with the said claw when the breech is opened, means for engaging said plate with the cannon and for releasing it therefrom, an outer cylinder provided with a bottom and disposed upon said plate parallel to the axis of the cannon an inner cylinder provided with a bottom and adapted to slide within said outer cylinder and to bear loosely against the cannon, a spring disposed within the two cylinders and adapted to bear upon the two cylinder bottoms and to separate the same, a longitudinal groove being formed in the wall of the outer cylinder, a fixed spring-bolt adapted to slide in the said groove and to engage at the rear of the inner cylinder bottom at the end of the recoil and during the return of the cannon to battery thereby effecting the compression of the spring, means for disengaging said plate, and means for releasing said spring bolt at the end of the recoil of said plate.

11. In a cannon provided with a counterbalanced rotating breech block and having therein an aperture for the passage of projectiles, a device for cartridge case extraction comprising a claw which is slidable upon said breech block parallel to the axis of said aperture, a hook provided at the forward end of said claw and engaging under the rim of the cartridge case when the breech is opened, a plate which is slidable upon the cannon parallel to the axis thereof, means for engaging said plate with the said claw when the breech is opened, means for engaging said plate with the cannon and for releasing it therefrom, an outer cylinder provided with a bottom and disposed upon said plate parallel to the axis of the cannon, an inner cylinder provided with a bottom and adapted to slide within said outer cylinder, and to bear loosely against the cannon, a spring disposed within the two cylinders and adapted to bear upon the two cylinder bottoms and to separate the same, means for retaining said inner cylinder during the return of the cannon to battery and for effecting the compression of said spring, means for disengaging said plate and for effecting the recoil of the same under the action of said spring, a third cylinder provided with a bottom and secured to said plate parallel to the axis of the cannon, said cylinder being adapted to bear by means of its bottom upon the rear of the cannon, a rod secured to the cannon and longitudinally slidable in said cylinder, a head provided at the outer end of said rod, a spring disposed between the bottom of said third cylinder and said head, the said spring being adapted to be compressed by the recoil of said plate and to return the plate to the initial position.

In testimony that I claim the foregoing as my invention, I have signed my name.

PROSPER JULES CHARBONNIER.